3,148,939
HYDRATES, METAL SALTS AND HYDRATED METAL SALTS OF ACID $H_2B_{10}H_{10}$
Walter Henry Knoth, Jr., Mendenhall, Pa., assignor to E. I. du Pont de Nemours and Company, Wilmington, Del., a corporation of Delaware
No Drawing. Filed Feb. 5, 1960, Ser. No. 6,855
18 Claims. (Cl. 23—14)

This invention relates to a novel boron-containing acid and metal salts thereof and to methods for their preparation.

More particularly, this invention is directed to compounds which can be represented by the formula:

(1) $\quad X_y(B_{10}H_{10})_z \cdot (H_2O)_p$ where X is selected from the group consisting of hydrogen and metal ions, y is the number of X ions and is a positive whole number greater than 0 and smaller than 3 (i.e., 1 or 2), z is equal to $$\frac{y \text{ times the valence of the X ions}}{2}$$

and p is the number of molecules of water of hydration and is a cardinal number from 0 to 3, inclusive.

In Formula 1, the value of p is independent of that for either y or z. When two or more X ions are present, these can be ions of the same or different element (i.e., hydrogen or a metal), but usually such ions in any given salt will all have the same valence, as in Formula 1.

The metal ions in the salts of this invention can be derived generally from any metal. The metals according to the Periodic Table in Deming's "General Chemistry," 5th ed., chap. 11, John Wiley & Sons, Inc., and in Lange's "Handbook of Chemistry," 9th ed., pp. 56–57, Handbook Publishers, Inc. (1956), are the elements of Groups I, II, VIII, III–B, IV–B, V–B, VI–B, VII–B and the elements of Groups III–A, IV–A, V–A, and VI–A which have atomic numbers above 5, 14, 33 and 52, respectively. These metals include both light and heavy metals. The light metals are also known as the alkali metals and the alkaline earth metals. The heavy metals include brittle, ductile and low-melting metals as described in the above-mentioned Periodic Table in Lange's "Handbook of Chemistry."

Preferred metal cations are drived from the elements of Groups I–A, II–A, I–B, II–B, and of Groups VI–B and VIII having an atomic number less than 75.

Most preferred metals for use in the salts of this invention are the light metals (the alkali and alkaline earth metals of Groups I–A and II–A, having an atomic number less than 87, i.e., lithium, sodium, potassium, rubidium, cesium, beryllium, magnesium, calcium, strontium, and barium, and elements of Group I–B having an atomic number less than 79 and of Group II–B having an atomic number less than 81, i.e., copper, silver, zinc, cadmium and mercury.

The anion of the novel boron-containing acid of this invention can be conveniently represented by the formula:

(2) $\quad B_{10}H_{10}^{--}$

The acid of this invention can be represented by the formula:

(3) $\quad H_2^{++}B_{10}H_{10}^{--} \cdot (H_2O)_n$ where n is a positive whole number greater than 1 and less than 4 (i.e., 2 or 3). The acid can also be represented as a hydronium compound, and as such is characterized by the formula:

(4) $\quad (H_3O)_2^{++}B_{10}H_{10}^{--} \cdot (H_2O)_m$ where m is the whole number 0 or 1. Formula 4 shows perhaps most clearly the form of the association of two moles of water in the acid. However, in this application, Formula 3 will be used to identify the novel acid of the present invention, except that when the acid is in $H_2O$ solution, water of hydration may be disregarded.

The boron-containing acid of Formula 3 is prepared by contacting an aqueous solution of a boron hydride amine salt with a strongly acidic cation exchange resin.

The boron hydride amine salt used can be represented by the formula:

(5) $\quad (R_3NH)_2B_{10}H_{10}$ wherein R is hydrogen or an alkyl radical (preferred alkyl radicals contain less than 19 carbon atoms). More preferred boron hydride amine salts for use in the present invention are those of Formula 5 wherein R is hydrogen or an alkyl radical of less than 7 carbon atoms.

The strongly acidic cation exchange resin is preferably of the sulfonic acid variety, for sulfonic acid resins are commonly available strongly acidic resins as the art appreciates.

Common strongly acid cation exchange resins which are commercially available include "Amberlite" IR–120–H, a trademark of the Rohm & Haas Co., and "Dowex" 50, a trademark of the Dow Chemical Co. These resins, in general, comprise a copolymer base of a styrene polymer cross-linked with a divinylbenzene which base is sulfonated to introduce sulfonic acid groups into the aryl nucleus as the polar groups.

As indicated, the boron hydride amine salt of Formula 5 is contacted with such a strongly acidic cation exchange resin. This contact is accomplished by passing an aqueous solution of the amine salt through the ion exchange resin, or, alternatively, by stirring the ion exchange resin in an aqueous solution of the amine salt. While the concentration of amine salt in the aqueous solution can vary over extremely wide limits and is entirely non-critical in value, it is preferred to use an aqueous solution containing from about 5 to 75 weight percent of the amine salt. Time of contacting is not critical.

The aqueous solution of the amine salt is conveniently passed through a cylindrical reaction tube packed with the ion exchange resin, or the ion exchange resin is stirred with an aqueous solution of the amine salt in a corrosion-resistant container. Any operating temperature between the freezing point and boiling point of water can be used.

In general, the pH of the effluent or filtrate (as the case may be) following contact with the exchange resin depends at least in part on concentration of $B_{10}H_{10}^{--}$ anion. Such effluent or filtrate is thus never neutral or basic (i.e., the pH is always less than 7).

The boron-containing acid is soluble in water and can be isolated from the clear, colorless, aqueous effluent by evaporation of the water at moderately elevated temperatures, e.g., 30–40° C. for several hours, preferably under reduced pressure (0.1–5 mm. of mercury). The residue is a liquid which is free of nitrogen.

The acid of this invention is strongly acidic and is stable indefinitely in aqueous solution. This is a unique property that is not exhibited by any other known boron hydride acid. This acid also has the unique property of being hypergolic with phosphorus pentoxide. The acid is soluble in ethers, alcohols, and water and it forms a red dye when reacted with concentrated nitric acid under certain conditions. The most significant bands in the infrared absorption spectrum of this acid are found at approximately 2.75, 4.0, 6.2, 9.25 and 9.7 microns. This acid is also a polymerization initiator, e.g., it polymerizes isobutylene at room temperature under a pressure of 1–3 atmospheres or more. This acid has a pKa value of approximately 1.5.

The metal salts of this invention can easily be prepared by any of three routes. On one, the acid is neutralized to a pH of at least 7 in aqueous solution with an aqueous dispersion (i.e., a solution or suspension) of an inorganic base containing the desired metal, such as an alkali or alkaline earth metal hydroxide.

In general, one will employ an aqueous solution of the inorganic base which contains from about 1 up to say 75 weight percent of the desired metal. In any given instance, of course, the actual amount of metal needed will be the molal equivalent weight needed to form the metal salt of the desired acid. Thus, this process involves the step of neutralizing an aqueous solution of the acid $H_2^{++}B_{10}H_{10}^{--}$ with an aqueous dispersion of an inorganic base containing the metal whose salt of $B_{10}H_{10}$ anion is desired.

The resulting aqueous solution of the metal salt of the $B_{10}H_{10}^{--}$ anion is concentrated by evaporation of water until the salt crystallizes out. The crystalline salt is then dried under reduced pressure, e.g., 0.1 mm. of mercury, and moderately elevated temperatures, e.g., 100° C. The water of hydration of the metal salts can be removed by heating for several hours at a temperature of about 200° C. under low pressure, e.g., 0.1 mm. mercury or even lower. This method is especially suitable for preparing alkali metal and alkaline earth metal salts.

In the second method, the salts of this invention can be prepared by reaction of a decaboryl bis(alkyl sulfide) with an inorganic base in aqueous, alcoholic, or aqueous-alcoholic solution. This reaction can be carried out at temperatures ranging from room temperature (20–30° C.) up to 100° C., the exact temperature selected in any particular case being dependent on the particular base employed. Preferably, the reaction is carried out at a temperature between 60° and 85° C.

The term "base" is used herein in its conventional meaning where it signifies any molecule or ion which is capable of combining with a proton (i.e., of acting as a proton acceptor)—see, for example, p. 309 of Moeller's "Inorganic Chemistry," John Wiley & Sons, Inc. (1952). Inorganic bases which are especially suitable for use in this process include the oxides, hydroxides and alkoxides of the metals of Groups I-A and II-A of the Periodic Table (e.g., the Table shown on p. 122 of Moeller's "Inorganic Chemistry") having an atomic number less than 57. Of course, when an oxide is employed as a reactant in an aqueous solution, the oxide is converted to the hydroxide which can then react with the decaboryl bis(alkyl sulfide).

A third way of preparing metal salts of the $B_{10}H_{10}^{--}$ anion is to add a solution of the boron hydride acid, $H_2^{++}B_{10}H_{10}^{--} \cdot (H_2O)_n$, or of a soluble salt of this acid, e.g., the ammonium salt, to a solution of a soluble salt of that metal whose $B_{10}H_{10}$ salt is desired under such conditions, e.g., particular solvent employed, that the desired $B_{10}H_{10}$ metal salt precipitates from the reaction solution. Thus, this process involves the step of adding to a solution of a soluble salt of that metal whose $B_{10}H_{10}$ salt is desired a second solution containing a member of the group consisting of the acid $H_2^{++}B_{10}H_{10}^{--}$ and metal salts thereof which are soluble in the chosen solvent system, the solvent system for the reactants being one in which the desired metal salt of the $B_{10}H_{10}^{--}$ anion is relatively insoluble and in which the other reaction products are relatively soluble.

A preferred solvent system for this process employs water. When one uses aqueous solutions, the process involves the step of adding to an aqueous solution of a water-soluble salt of such metal a second aqueous solution of a compound selected from the group consisting of the acid $H_2^{++}B_{10}H_{10}^{--}$ and its water-soluble salts. For example, an aqueous solution of silver nitrate or mercuric nitrate is added to an aqueous solution of the boron hydride acid whereupon the metal salt of the $B_{10}H_{10}$ ion precipitates out as a white or light-colored salt. This method is especially suitable for preparing heavy metal salts, although it is not restricted to these particular metals. It is preferable that the preparation of the silver salt be conducted under conditions providing minimum exposure to light, although exclusion of light is not essential for operability. Another example of this method is to add an aqueous solution of a metal salt, e.g., cesium fluoride or silver nitrate, to an aqueous solution of the ammonium salt of $B_{10}H_{10}^{--}$, whereupon the cesium or silver salt of $B_{10}H_{10}$ precipitates immediately as a white or light-colored salt.

The metal salts of this invention, as well as the free acid, possess high hydrolytic stability. For example, they can be refluxed with methanolic solutions of sodium methoxide for several hours without undergoing hydrolysis. This stability is quite unusual for boron hydride salts.

The amine salts of the $B_{10}H_{10}^{--}$ anion used as starting materials in the process of this invention can be prepared by reaction of 2 moles of a primary, secondary, or tertiary alkylamine or of ammonia with 1 mole of a decaboryl bis(alkyl sulfide), e.g., decaboryl bis(dimethyl sulfide), at a temperature between about —50° and 100° C. The preparation of such amine salts of the $B_{10}H_{10}^{--}$ anion is described in greater detail in Serial No. 6,853, filed February 5, 1960, and Serial No. 6,854, filed February 5, 1960.

The decaboryl bis(alkyl sulfide) used as the precursor for the amine salts can be prepared by reaction of 1 mole of decaborane with 2 moles of a dialkyl sulfide at a temperature between 0° and 100° C., as described in greater detail in U.S. application Ser. No. 750,862, filed July 25, 1958.

The products and process of this invention are illustrated in further detail in the following examples:

*Example A*

PREPARATION OF $B_{10}H_{12} \cdot 2(CH_3)_2S$

A reaction vessel having capacity of about 365 ml. is charged with 0.79 g. (6.5 millimoles) of decaborane, cooled in liquid nitrogen, and then evacuated to a pressure of 10 microns of mercury. Approximately 21 g. of methyl sulfide is condensed onto the decaborane in the reaction vessel. The reaction vessel is closed, and then allowed to warm to room temperature and stand for 4 days. During this time, 6.6 millimoles of hydrogen is evolved. The reaction vessel is then opened and excess methyl sulfide is removed by distillation, leaving a practically quantitative yield of white solid residue of $$B_{10}H_{12} \cdot 2(CH_3)_2S$$

*Analysis.*—Calc'd. for $B_{10}C_4H_{24}S_2$: B, 44.26%; C, 19.67%; H, 9.84%; mol. wt., 244. Found: B, 43.67%; C, 21.17%; H, 10.00%; mol. wt., 220, 213.

*Example B*

PREPARATION OF 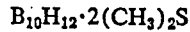

Decaboryl bis(dimethyl sulfide) (8.5 g., 3.5 millimoles) is mixed into 50 ml. of liquid ammonia and stirred in a round-bottomed reaction vessel for 1 hour with the vessel being cooled to a temperature of about —50° C. by partial immersion in a bath of a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is a virtually quantitative yield of $(NH_4)_2B_{10}H_{10}$.

*Analysis.*—Calc'd. for $B_{10}H_{18}N_2$: B, 70.0%; H, 11.7%; N, 18.2%. Found: B, 66.7%; H, 12.2%; N, 18.5%.

Example C

PREPARATION OF [(CH₃)₃CNH₃]₂B₁₀H₁₀

Five grams of decaboryl bis(dimethyl sulfide) of the formula $B_{10}H_{12} \cdot 2(CH_3)_2S$ (2.5 millimoles) and 50 ml. of tert.-butylamine are mixed and heated at reflux temperature (approximately 45° C.) for 1.5 hours. The solid reaction product that is formed is removed by filtration and dried under vacuum (0.1 mm. of mercury). There is obtained 4.6 g. (83.5% of theory) of the boron hydride amine salt $[(CH_3)_3CNH_3]_2B_{10}H_{10}$ in almost pure form.

*Analysis.*—Calc'd. for $B_{10}C_8H_{34}N_2$: B, 40.6%; C, 36.06%; H, 12.86%; N, 10.51%. Found: B, 39.73%; C, 36.56%; H, 12.72%; N, 10.47%.

A small amount of water-insoluble material is present in this product. This can easily be removed by extracting the $[(CH_3)_3CNH_3]_2B_{10}H_{10}$ with water.

Example I

PREPARATION OF $H_2^{++}B_{10}H_{10}^{--}(H_2O)_3$

A solution of 3.6 g. of $[(CH_3)_3CNH_3]_2B_{10}H_{10}$ in 30 ml. of water is passed through a 0.5" diameter chromatography column containing 80 ml. of the ion exchange resin known commercially as "Amberlite," IR–120, acid form. The water effluent obtained is clear, colorless and acidic. The column is rinsed with more water until the effluent is no longer acidic and the water fractions are combined. Evaporation of this aqueous solution under reduced pressure (1 mm. mercury) at a temperature of about 40° C. leaves a yellow liquid acid which is $$H_2^{++}B_{10}H_{10}^{--}(H_2O)_3$$

As noted previously, the formula for this acid can also be written as $(H_3O)_2^{++}B_{10}H_{10}(H_2O)$. Comparison of the infrared absorption spectrum of this acid with the spectra of other salts of the $B_{10}H_{10}^{--}$ anion establishes the presence of the anion. The complete removal of the tert.-butyl-ammonium cation is proved by the absence of nitrogen in the product as determined by elemental analysis. The presence of the hydronium cation is shown by the acidic nature of the product and is in agreement with the infrared absorption spectrum.

*Analysis.*—Calc'd. for $B_{10}H_{18}O_3$: B, 61.9% H, 10.5%; N, 0.0%. Found: B, 61.4% H, 9.52%; N, 0.0%.

The acid is unique in that it is hypergolic with phosphorus pentoxide. This provides a new high energy combination for propulsion purposes. The addition of the acid to phosphorus pentoxide causes the acid to ignite and to burn rapidly. The acid is stable at ordinary and slightly elevated temperatures, i.e., up to about 50° C.

Further drying under vacuum of the compound of Example I produces a compound of the formula $$H_2^{++}B_{10}H_{10} \cdot (H_2O)_2 \text{ or } (H_3O)_2^{++}B_{10}H_{10}$$

This dihydrate is a water-soluble white solid with essentially the same infrared absorption spectrum as the trihydrate of Example I.

Example II

PREPARATION OF Na₂B₁₀H₁₀

A solution of $H_2^{++}B_{10}H_{10}^{--}(H_2O_3)$ in about 100 ml. of water is prepared from $(NH_4)_2B_{10}H_{10}$ and an acidic ion exchange resin as described in Example I. The solution is neutralized with 2 N sodium hydroxide solution and the resulting reaction mixture is concentrated under reduced pressure until crystallization of the residue occurs. The residue is further dried under reduced pressure (about 0.1 mm. of mercury) at 56° C. for 18 hours.

*Analysis.*—Calc'd for $Na_2B_{10}H_{10} \cdot H_2O$: B, 59.4%; H, 6.6%; Na, 25.3%. Found: B, 57.13%; H, 5.83%; Na, 24.6%.

The water of hydration of the sodium salt, prepared as described above, can be removed by heating at 180° C. for 3 hours at a pressure of less than 0.1 mm. of mercury.

*Analysis.*—Calc'd for $Na_2B_{10}H_{10}$: Na, 66.0%. Found: Na, 64.39%.

Example III

PREPARATION OF BaB₁₀H₁₀

An aqueous solution of $H_2^{++}B_{10}H_{10}^{--}(H_2O_3)$ having a concentration of 3 g. of acid per 100 ml. of water is added to a slurry of 1.8 g. of barium hydroxide in water until the barium hydroxide is neutralized. Evaporation of the water leaves a crystalline white solid residue. The residue is heated at 110° C. for 4 hours at a pressure of less than 0.1 mm. of mercury. The dried product is a compound of the formula $BaB_{10}H_{10}$.

*Analysis.*—Calc'd for $BaB_{10}H_{10}$: Ba, 53.6%; B, 42.4%. Found: Ba 53.11%; B, 41.26%.

The barium salt can also be obtained as a trihydrate, i.e., $BaB_{10}H_{10} \cdot 3H_2O$ [Ba (calc'd), 44.4%; Ba (found), 43.69%].

Example IV

PREPARATION OF Ag₂B₁₀H₁₀

An aqueous solution of silver nitrate is added to a solution of $H_2^{++}B_{10}H_{10}^{--} \cdot 3H_2O$ in water. A white or slightly cream colored solid precipitates from the reaction mixture. To obtain a white precipitate, it is preferable to employ an excess of the acid, i.e., an excess of $$H_2^{++}B_{10}H_{10}^{--} \cdot 3H_2O$$

The reaction may be performed in the absence of light to minimize darkening of the silver salt but it is not essential that light be excluded. The salt is separated by filtration. The solid residue is rinsed with ethyl alcohol and it is then dried in air. The identity of the compound is confirmed by elemental analysis.

*Analysis.*—Calc'd for $Ag_2B_{10}H_{10}$: Ag, 64.7%; B, 32.4%. Found: Ag. 65.42%; B, 31.88%.

Infrared absorption spectra obtained from the silver salt shows that it is anhydrous.

The compound of Example IV is a unique silver salt of a boron hydride. All other such compounds are unstable and yield elemental silver. The silver salt, after exposure to light, can be reduced, i.e., developed, by commercially available photographic developers and it, therefore, has potential usefulness in photographic and copying processes.

Examples II–IV illustrate the salts of the invention by reference to three particular metal salts. However, other metal salts are included. Thus, if the process of Example II is repeated with the exception that the sodium hydroxide is replaced with lithium, potassium, rubidium or cesium hydroxides, the corresponding lithium, potassium, rubidium and cesium salts of the $B_{10}H_{10}^{--}$ anion are produced. Likewise, when the barium hydroxide used in Example III is replaced by other alkaline earth metal hydroxides, e.g., beryllium, magnesium, calcium or strontium hydroxides, the corresponding beryllium, magnesium, calcium and strontium salts of the $B_{10}H_{10}^{--}$ anion are produced. Oxides of metals, as well as the hydroxides, can be employed in the process of Example III to obtain metal salts. To illustrate, the oxides (or hydroxides) of nickel, tin, lead, chromium, bismuth and iron may be used to obtain the nickel, tin, lead, chromium, bismuth and iron salts of the $B_{10}H_{10}^{--}$ anion.

Nitrates of metals generally can be employed in the process of Example IV to obtain heavy metal salts. To illustrate, by using mercuric nitrate in the process of Example IV, there is obtained the mercury salt of the $B_{10}H_{10}^{--}$ anion, i.e., $HgB_{10}H_{10}$.

Carbonates of metals can be used with aqueous solutions of the boron acid of the invention to obtain the corresponding metal salts. To illustrate, the carbonates of beryllium, magnesium, zirconium, manganese, cobalt, nickel, or zinc react with an aqueous solution of $$H_2^{++}B_{10}H_{10}^{--}(H_2O)_3$$

to form the corresponding metal salts of the acid. A wide range of metal salts of the boron-containing acid can thus be obtained by using the appropriate metal compound as a reactant. These metal salts include, in addition to those named previously, the salts of vanadium, molybdenum, tungsten, copper, germanium, antimony, and the like.

The soluble metal salts of this invention can be converted to the free acid $H_2^{++}B_{10}H_{10}^{--}(H_2O)_n$, by passing the aqueous solution of the salts through an ion exchange column as described in Example I.

*Example V*

PREPARATION OF $Cs_2B_{10}H_{10} \cdot H_2O$

A solution of 56 g. of $(NH_4)_2B_{10}H_{10}$ in 105 ml. of water is mixed with 120 ml. of a 50% aqueous solution of cesium fluoride. A white precipitate forms immediately. This precipitate is recrystallized from water and there is obtained 83 g. of coarse, white needles of $$Cs_2B_{10}H_{10} \cdot H_2O$$

The infrared absorption spectrum obtained with this salt has a very intense BH band at 4.0 microns and weak skeletal bands at 9.1, 9.3 and 9.7 microns. $NH_4$ bands are totally absent. This salt is slightly hygroscopic.

*Analysis.*—Calc'd for $Cs_2B_{10}H_{12}O$: B, 26.91%; H, 3.09%. Found: B, 27.23%; H, 3.16%.

*Example VI*

PREPARATION OF $ZnB_{10}H_{10}$

A saturated solution of zinc acetate in ethyl alcohol (30 ml.) is mixed with a solution of 0.5 g. of $(NH_4)_2B_{10}H_{10}$ in 2 ml. of ethyl alcohol. The solid which precipitates from the reaction mixture is rinsed with a small amount of ethyl alcohol and dried. The infrared absorption spectrum of this product indicates that $ZnB_{10}H_{10}$ is present.

*Example VII*

PREPARATION OF $CsCuB_{10}H_{10}$

A solution of 12.0 g. of cupric nitrate trihydrate in 30 ml. of water is mixed with a solution of 1.1 g. of $(NH_4)_2B_{10}H_{10}$ in 15 ml. of water (acidified with nitric acid) and a dark blue color forms. Approximately 10 ml. of this blue reaction mixture is mixed with 3 ml. of a concentrated (approximately 50%) aqueous solution of cesium chloride. A light gray solid precipitates from the reaction mixture and this solid is filtered out and dried at room temperature. This is the mixed copper cesium salt of the $B_{10}H_{10}$ anion.

*Analysis.*—Calc'd for $CsCuB_{10}H_{10}$: B, 34.4%; Cs, 42.3%; Cu, 20.2%; H, 3.18%. Found: B, 36.53%; Cs, 38.5%; Cu, 16.79%; H, 4.08%.

*Example VIII*

A solution of 10.8 g. (0.2 mole) of sodium methylate in 100 ml. of methyl alcohol is added to a solution of 24.4 g. (0.1 mole) of decaboryl bis(dimethyl sulfide) in 100 ml. of methyl alcohol. The mixture is stirred for 1 hour at room temperature (approx. 25° C.) and for 1.5 hours under reflux. At the end of this period, the reaction mixture is filtered and the filtrate is evaporated to dryness. There is obtained 18 g. of a white, powdery solid. The infrared absorption spectrum of this solid indicates the product to be the sodium salt of the $B_{10}H_{10}^{--}$ anion, i.e., $Na_2B_{10}H_{10}$.

*Example IX*

A mixture of 2.25 g. of decaboryl bis(dimethyl sulfide), 0.65 g. of sodium hydroxide and 20 ml. of water is heated on a steam bath for 15 minutes. The reaction mixture is filtered, and the filtrate is evaporated to dryness. The residue, which is the sodium salt $Na_2B_{10}H_{10}$, is dissolved in methyl alcohol. The addition of a methyl alcoholic solution of tetramethylammonium chloride to the solution of $Na_2B_{10}H_{10}$ causes a precipitate of $[(CH_3)_4N]_2B_{10}H_{10}$. The infrared absorption spectrum of this tetramethylammonium salt of $B_{10}H_{10}^{--}$ is in agreement with the spectrum of an authentic sample of this salt.

The acid of this invention and its metal salts are useful as intermediates in the formation of dyes. For example, when concentrated nitric acid is added dropwise to a 50% aqueous solution of the acid $$H_2^{++}B_{10}T_{10}^{--}(H_2O)_3$$

a point is reached at which a dark blue color forms. Addition of the nitric acid is stopped and the solution is stirred for several minutes, at which point the color of the solution is dark red. The solution is useful for dyeing polyacrylonitrile fibers. Polyacrylonitrile staple fiber, immersed in this red solution and boiled for about 2 minutes, is dyed an attractive red color. The solution of the dye prepared as described above can be diluted with water, if desired, for using it as a dye bath. When the pH of the solution is brought to 4–5 by addition of sodium carbonate, the solution is suitable for dyeing fibers of cellulose acetate and of nylon. Various shades can be produced by changing the pH of the dye bath or the duration and temperature of the dyeing step. Treatment of salts of the boron hydride anion $B_{10}H_{10}^{--}$ with nitric acid in the manner described above for the free acid produces dyes that are useful for dyeing cellulose acetate, nylon and polyacrylonitrile fibers and fabrics.

The acid of this invention and its hydrates are useful in high energy fuels. The acid and its hydrates are ignited by treatment with concentrated nitric acid or with phosphorus pentoxide and the compounds burn rapidly. The salts are also useful as compounds of high energy fuels, particularly with nitric acid. The silver salt can be used in photographic processes.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound having the formula $$X_y(B_{10}H_{10})_x \cdot (H_2O)_p$$

where X is selected from the group consisting of hydrogen and metal ions, $y$ is the number of X ions and is a positive whole number greater than 0 and smaller than 3 (i.e., 1 or 2), $z$ is equal to $$\frac{y \text{ times the valence of the X ions}}{2}$$

and $p$ is the number of molecules of water of hydration and is a cardinal number from 0 to 3, inclusive.

2. Salts of the formula:

$$X_2(B_{10}H_{10}) \cdot (H_2O)_p$$

where X is a Group I–A metal and $p$ is a positive whole number less than 4.

3. The acid having the formula:

$$H_2^{++}B_{10}H_{10}^{--} \cdot (H_2O)_n$$

where $n$ is a positive whole number greater than 1 and less than 4.

4. The compound having the formula:

$$Na_2(B_{10}H_{10}) \cdot (H_2O)_p$$

where $p$ is a whole number from 0 through 3.

5. The compound having the formula:

$$Cs_2(B_{10}H_{10}) \cdot (H_2O)_p$$

where $p$ is a whole number from 0 through 3.

6. The compound having the formula:

$$Ba(B_{10}H_{10}) \cdot (H_2O)_p$$

where $p$ is a whole number from 0 through 3.

7. The compound having the formula:

$$Ag_2(B_{10}H_{10}) \cdot (H_2O)_p$$

where $p$ is a whole number from 0 through 3.

8. The compound having the formula:

$$Zn(B_{10}H_{10}) \cdot (H_2O)_p$$

where $p$ is a whole number from 0 through 3.

9. In a method for preparing the acid $$H_2{}^{++}B_{10}H_{10}{}^{--} \cdot (H_2O)_n$$

where $n$ is a positive whole number greater than 1 and less than 4, the step of contacting an aqueous solution of an amine salt having the formula:

$$(R_3NH)_2B_{10}H_{10}$$

where R is selected from the group consisting of hydrogen and alkyl radicals having less than 19 carbon atoms each with a strongly acidic cation exchange resin.

10. The process of claim 9 wherein the amine salt is $[(CH_3)_3CNH_3]_2B_{10}H_{10}$.

11. The process of claim 9 wherein the amine salt is $(NH_4)_2B_{10}H_{10}$.

12. In a method for preparing a metal salt of the $B_{10}H_{10}{}^{--}$ anion, the step of neutralizing an aqueous solution of the acid $H_2{}^{++}B_{10}H_{10}{}^{--}$ with an aqueous dispersion of an inorganic base containing a metal cation.

13. In a method for preparing a metal salt of the $B_{10}H_{10}{}^{--}$ anion, the step of adding to a first solution of a soluble salt of a metal with an anion other than $B_{10}H_{10}{}^{--}$ a second solution containing a member of the group consisting of the acid $H_2{}^{++}B_{10}H_{10}{}^{--}$ and salts thereof with metals other than those in the first solution, the solvent system for the reactants being one in which the first-mentioned metal salt of the $B_{10}H_{10}{}^{--}$ anion is relatively insoluble and in which the other reaction products are relatively soluble.

14. The process of claim 13 wherein that metal whose metal salt is desired is a Group I–A metal.

15. In a method for preparing a relatively water-insoluble metal salt of the $B_{10}H_{10}{}^{--}$ anion, the step of adding to an aqueous solution of a relatively water-soluble salt of such metal a second aqueous solution of a compound selected from the group consisting of the acid $$B_2{}^{++}B_{10}H_{10}{}^{--}$$

and its water-soluble salts.

16. In a method for preparing a metal salt of the $B_{10}H_{10}{}^{--}$ anion, the step of reacting a decaboryl bis-(alkyl sulfide) with a base.

17. In a method for preparing a metal salt of the $B_{10}H_{10}{}^{--}$ anion, the steps of reacting a decaboryl bis-(alkyl sulfide) with an amine to form an amine salt of the $B_{10}H_{10}{}^{--}$ anion, and then reacting said amine salt with an inorganic base.

18. An aqueous solution of the acid having the formula $$H_2{}^{++}B_{10}H_{10}{}^{--}$$

References Cited in the file of this patent

Lipscomb: J. Am. Chem. Soc., vol. 81, No. 21, pp. 5833, 5834, Nov. 5, 1959.

UNITED STATES PATENT OFFICE
CERTIFICATE OF CORRECTION

Patent No. 3,148,939            September 15, 1964

Walter Henry Knoth, Jr.

It is hereby certified that error appears in the above numbered patent requiring correction and that the said Letters Patent should read as corrected below.

Column 10, line 14, the formula should appear as shown below instead of as in the patent:

$$H_2^{++} B_{10} H_{10}^{--}$$

Signed and sealed this 5th day of January 1965.

(SEAL)
Attest:

ERNEST W. SWIDER            EDWARD J. BRENNER
Attesting Officer            Commissioner of Patents